Figures 1, 5:
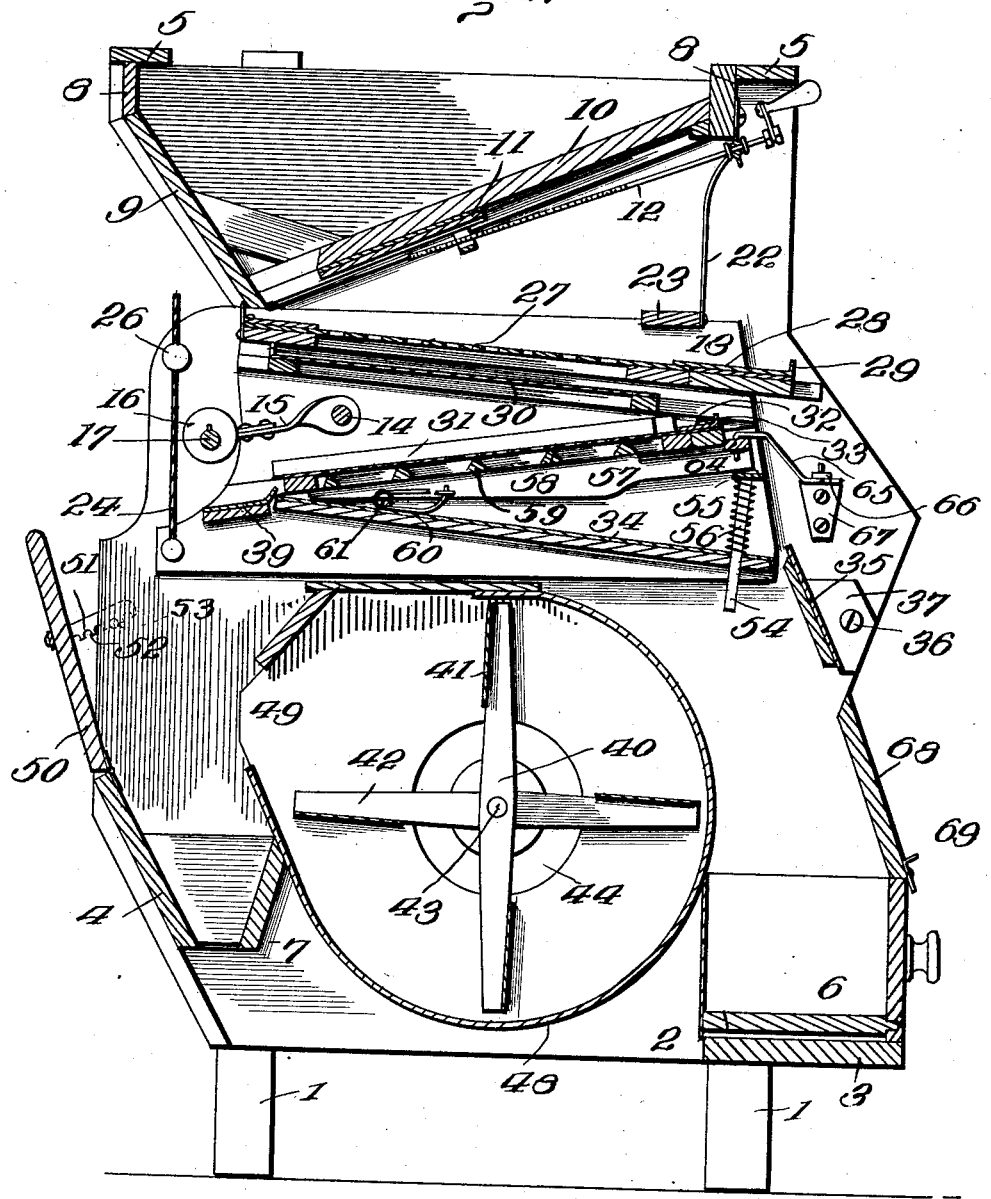

H. W. SMITH.
GRAIN AND SEED CLEANER.
APPLICATION FILED JUNE 11, 1913.

1,097,887.

Patented May 26, 1914.
3 SHEETS—SHEET 1.

Witnesses

Inventor
H. W. Smith.
By
Attorneys.

H. W. SMITH.
GRAIN AND SEED CLEANER.
APPLICATION FILED JUNE 11, 1913.
1,097,887.
Patented May 26, 1914.
3 SHEETS—SHEET 2.
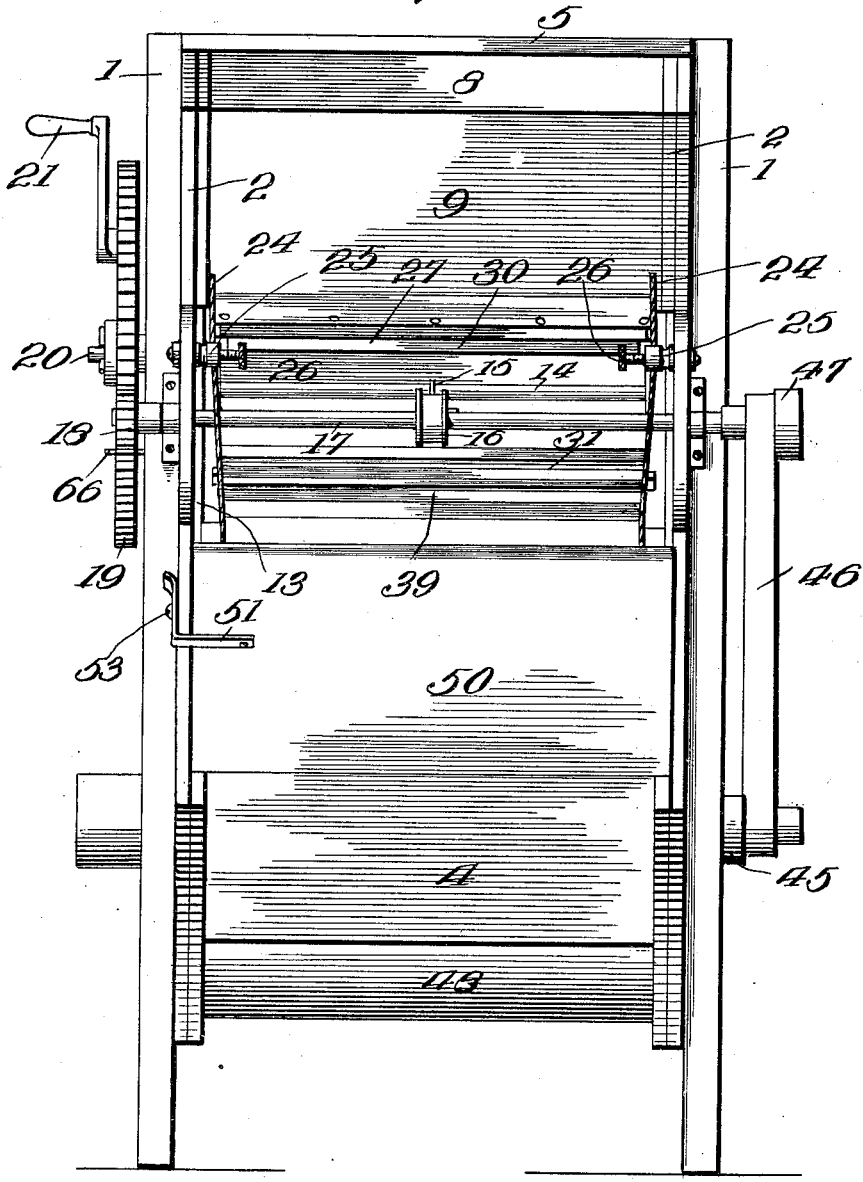

H. W. SMITH.
GRAIN AND SEED CLEANER.
APPLICATION FILED JUNE 11, 1913.
1,097,887.
Patented May 26, 1914.
3 SHEETS—SHEET 3.
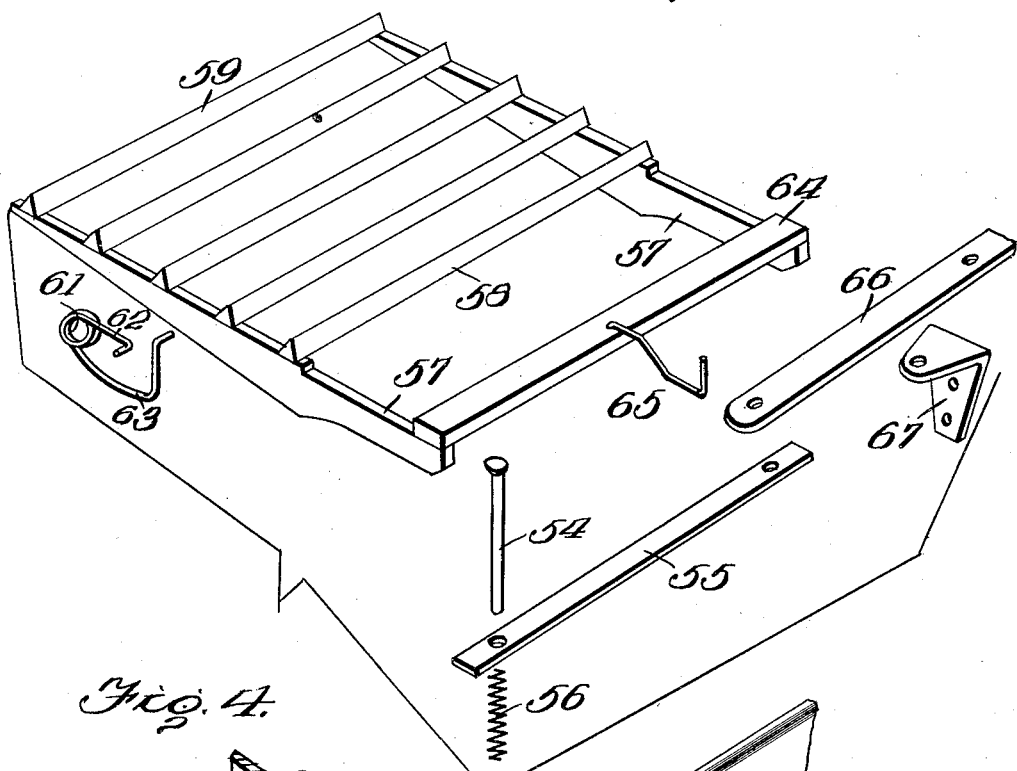
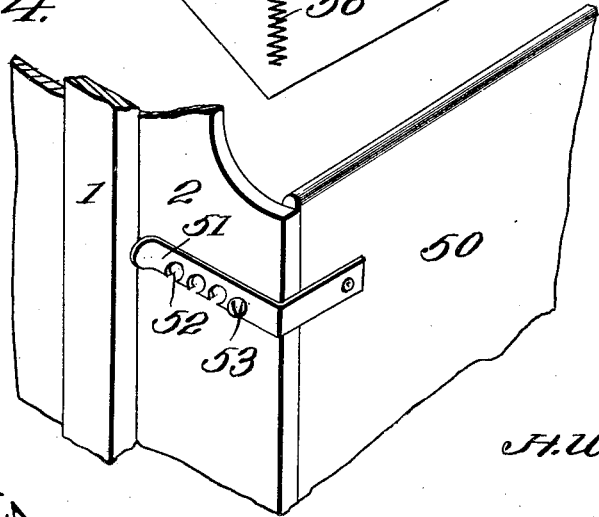

UNITED STATES PATENT OFFICE.

HARVEY W. SMITH, OF SELINSGROVE, PENNSYLVANIA.

GRAIN AND SEED CLEANER.

1,097,887.

Specification of Letters Patent. Patented May 26, 1914.

Application filed June 11, 1913. Serial No. 773,123.

*To all whom it may concern:*

Be it known that I, HARVEY W. SMITH, citizen of the United States, residing at Selinsgrove, in the county of Snyder and State of Pennsylvania, have invented certain new and useful Improvements in Grain and Seed Cleaners, of which the following is a specification.

This invention relates to grain and seed cleaners and has for one of its objects the provision of a simple and compactly arranged mechanism by the use of which good seeds will be separated from the undeveloped and imperfect seeds and from the dirt commingled therewith so that a superior quality of seed or grain may be obtained for planting or other commercial purposes.

Another object of the invention is to provide a simple and efficient device by the use of which a screen may be cleaned of the small seeds which tend to collect in the perforations of the same.

The invention also seeks to improve generally the construction and arrangement of the parts of a separator to the end that the durability and efficiency of the same may be increased without increase in the cost of production and upkeep.

The invention is illustrated in the accompanying drawings and will be hereinafter fully described, the novel features being subsequently more particularly pointed out in the claims following the description.

In the drawings: Figure 1 is a vertical longitudinal section of a separator embodying my present improvements; Fig. 2 is an end view of the same; Fig. 3 is a perspective view of the parts of the screen cleaner showing the same separated but in their proper relative positions; Fig. 4 is a detail perspective view of the adjustable wind shield; Fig. 5 is a detail view of a securing device.

The frame of my improved machine comprises essentially posts or standards 1 to which side plates 2 are rigidly secured and cross bars 3 and 4 rigidly secured to and extending between the lower portion of the said side plates, while upper cross bars 5 are secured to and extend between the upper ends of the said side plates. The cross bar 3, as shown clearly in Fig. 1, is disposed horizontally and forms a shelf or support for a box or drawer 6 which receives the screenings during the operation of the machine, while the cross bar 4 forms the outer side wall of a chute by which the good seeds are directed into any convenient receptacle placed below said chute, as will be readily understood. The inner wall of the chute is provided by a cross bar or plate 7 secured to and extending between the side plates 2 and diverging downwardly toward the cross plate or bar 4, as clearly shown in Fig. 1. The cross bars 5 serve principally as braces to maintain the proper spaced relation of the side plates and impart rigidity to the structure and other cross bars 8 depend from the said cross bars 5, while downwardly converging plates 9 and 10 extend from the said cross bars 8 to constitute a hopper in which the seed or grain to be cleaned may be placed. On the under side of the plate 10 is slidably mounted a cut-off 11 by which the flow of grain to the screens may be regulated and this cut-off is adjusted by a screw 12 supported upon the hopper in the usual manner.

A shoe 13 is suspended between the side plates below the hopper and a cross rod 14 extends between the sides of the shoe and is connected by a pitman 15 to an eccentric 16 mounted upon a shaft 17 journaled in and extending through the side plates 2 as shown most clearly in Fig. 2. Upon one end of this shaft 17 is mounted a pinion 18 meshing with a driving gear 19 carried by a shaft 20, which is suitably mounted upon the side of the machine, and provided with a handle 21 so that if the driving gear be rotated motion will be imparted to the shaft 17 which will in turn be transmitted through the eccentric 16 and the pitman 15 to the cross rod 14 and the shoe thereby reciprocated. The shoe is suspended at one end by resilient straps or hangers 22 which are secured at their lower ends to a cross bar 23 at the top of the shoe and at their upper ends to one cross bar 8 or some other convenient part of the frame, as will be readily understood. The opposite end of the shoe is supported by flexible hangers 24 secured at their lower ends in any convenient manner to the lower corners of the shoe and having their upper portions inserted through posts 25 secured in the side plates 2 of the frame, set screws 26 being mounted in the inner ends of the said posts so as to bear upon the hangers 24 and thereby secure the same in the posts. It will be readily understood that this arrangement permits the shoe to be suspended at any desired inclination so that the rapidity of movement of the seeds over the screens may be regulated to such extent as may be necessary to obtain the best results in any particular case.

The top of the shoe is arranged directly beneath the discharge opening of the hopper and the upper screen 27 is fitted in the shoe immediately adjacent the upper edges thereof. This screen 27 is inclined relative to the top of the shoe and to the hopper so that the natural movement of the seed or grain over said screen will be away from the discharge opening of the hopper and toward the opposite end of the frame, and at the said end of the screen I provide an imperforate plate 28 having an upstanding lip or flange 29 at its outer edge by which the coarse dirt separated from the seed or grain will be deflected toward the side plates of the main frame and consequently prevented in its escape from mingling with the seed passing through the screen and flowing onto the upper end of the under screen. A pan or imperforate plate 30 is mounted in the shoe below and adjacent the upper screen 27 and is disposed parallel therewith, said pan or plate terminating short of the outer edge of the deflecting plate 28 and the upper end of the lower screen so that the seed and material flowing from the said pan or plate 30 will be deposited upon the upper end of the lower screen as will be readily understood upon reference to Fig. 1. This lower screen 31 is inclined downwardly from the upper screen toward the opposite end of the shoe and the main frame so that the seed or grain in its passage over the two screens will be caused to travel back and forth through the entire length of the shoe. At the upper end of the lower screen 31 a plate 32 is provided and said plate is equipped with a lip or upstanding flange 33 at its outer edge so that the said plate serves as a receiver or guide to direct the seed and material flowing from the pan 30 downwardly onto the upper screen. Below the said screen 31, and extending downwardly away from the same substantially parallel with the upper pan 30, is a lower imperforate plate or pan 34 by which the screenings and fine material passing through the lower screen will be caused to flow toward a deflector or shield 35 and by the same directed to the drawer or box 6. This deflector or shield 35 consists of an imperforate plate extending between the side plates 2 and disposed immediately adjacent the lower end of the plate 34 and secured to the said side plates 2 by bolts 36 inserted through the lugs 37 at the ends of said deflector and the side plates 2 and equipped at their outer ends with thumb nuts 38 so that by turning the said thumb nuts home against the side plates 2 of the frame the said deflector may be secured in any position to which it may be adjusted and thereby provide more or less clearance between the end of the plate or pan 34 and the said deflector, as will be readily understood. The upper end of the pan or plate 34 is immediately adjacent the lower end of the screen 31 and a downwardly inclined plate 39 is secured within the shoe immediately adjacent said ends of said screen and pan so that the seed flowing from said screen will be carried slightly away from the screen before being exposed to the action of a blast from a fan 40 arranged below the shoe. The said fan 40 consists of blades 41 carried by arms or spokes 42 radiating from a fan shaft 43 which is journaled in suitable brackets secured on the side plates 2 and extending over the air inlet openings 44 provided in said side plates. One end of the fan shaft 43 is equipped with a stepped series of pulleys 45, and a belt 46 is trained around one of said pulleys and a corresponding one of a series of stepped pulleys 47 on the end of the shaft 17 so that the fan will be rotated simultaneously with the operation of the shoe. By shifting the belt 46 axially of the series of stepped pulleys the rotation of the shaft may be easily governed. The fan is housed within a casing 48 arranged between the side plates 2 and so constructed as to provide an exit 49 above the chute consisting of the plates 4 and 7 and below the seed directing plate 39. To the upper edge of the transverse plate or bar 4 I hinge a wind shield 50 which may be supported at various angles, relative to the said plate 4 and the shoe, by a keeper 51 provided in its lower edge with notches 52 adapted to engage over a pin or stud 53 on the adjacent side plate 2. The blast from the fan may thus be permitted to act with more or less force upon the seed escaping over the lower edge of the directing plate 39 so that a greater or less proportion of said seed may be blown from the machine according to the quality of the material being treated.

Within the pan or plate 34 adjacent the lower end thereof I mount pins 54 having their upper ends fitted in a transverse bar 55, and springs 56 coiled around said pins between the said bar and the pan tend to hold the bar upward from the pan. This bar 55 forms the outer support for a cleaner consisting of side bars 57 and cross bars 58 secured upon and extending between said side bars. These cross bars 58 have reduced upper edges, as shown at 59, which bear directly against the under side of the screen 31 and are yieldably held to the said screen by the springs 56 acting against the bar 55 and by resilient runners 60 carried by the side bars 57 near the inner ends thereof. These resilient runners consist of coils 61 having upper and lower arms 62, 63 extending therefrom, the upper arms 62 being fitted in any convenient manner to the side bars 57 while the lower arms 63 bear upon the pan or plate 34 and have their extremities turned upwardly and secured to the said side bars 57. The outer extremities of the side bars 57 are connected by a cross bar 64, and a pitman or link 65 has one end pivoted in said cross bar and its opposite end pivoted in a lever 66 which extends through one of the side plates 2 and is fulcrumed upon a bracket 67 secured to said side plate.

When the shoe reciprocates under the influence of the eccentric 16 and the parts coöperating therewith, the cleaner will reciprocate therewith. If, however, small seed or other matter should collect within the perforations of the lower screen so as to clog the same, the projecting end of the lever 66 may be vibrated and motion will thus be imparted to the cleaner relative to the shoe and independent of the shoe so that the upper reduced edges 59 of the cross bars 58 will be reciprocated upon the under surface of the screen and consequently the foreign matter or tiny seeds will be dislodged and the screen cleared with a few strokes of the cleaner.

From the foregoing description taken in connection with the accompanying drawings, it will be seen that I have provided a very compact machine by which grain or seeds may be rapidly and efficiently cleaned and freed of all foreign matter and it will not be necessary to remove the screen in order to clean the same so that the use of the machine may continue uninterruptedly until the entire quantity of material has been treated. The upper screen is of large mesh so that the coarse dirt will be removed from the seeds, and all the seeds will pass through the screen and be deposited upon the lower screen. The lower screen, however, is of much finer mesh and will permit only the screenings and fine dirt to pass therethrough, the seeds passing from the screen over the seed directing plate 39 and then dropping to the cross plates 4 and 7 and so into the receptacle, as previously stated. The blast from the fan will be directed against the falling stream of seed and the chaff and lighter worthless seed will be blown out over the shield 50, while the heavier desirable seed will pass to the receptacle provided therefor. The coarse dirt flowing from the plate 28 will fall outside the machine and any portion thereof which may tend to mingle with the screenings will be deflected therefrom by the plate 35, as will be readily understood, and in order to further prevent the commingling of the coarse dirt with the screenings a plate 68 is provided between the side plates 2 and extends from the drawer 6 to the deflector 35, as clearly shown in Fig. 1, and a hasp or other fastening 69 may be provided upon this plate to prevent accidental withdrawal of the drawer 6. By mounting the screens within a shoe a single operating shaft is sufficient to vibrate all the screens and by disposing this shoe, with the screens carried thereby, immediately below the hopper and arranging the fan immediately below the shoe, I provide a very compact machine so that a machine of small size may be economically used to efficiently treat large quantities of seed. The machine may be constructed very economically inasmuch as there is no unnecessary material used in building the machine and the parts are not widely separated so as to occupy a large space within the work room.

Having thus described the invention, what I claim is:

1. In a separator, the combination with a screen and a pan below the screen, of a cleaner yieldably supported by the pan below the screen and in contact with the screen, and means connected with the cleaner for reciprocating the same independently of the screen and the pan.

2. In a separator, the combination of a screen, a pan disposed below the screen and inclined away from the screen, means for vibrating the said screen and pan, a yieldable support mounted in one end of the pan, a cleaner arranged below and in contact with the screen and resting upon said yieldable support at one end and supported upon the pan at its opposite end, and means for reciprocating said cleaner independently of the screen and pan.

3. In a separator, the combination of a screen, a pan disposed below the screen and inclined away from the same, a cleaner mounted below the screen and in contact therewith, resilient runners fitted to the inner end of the cleaner, means for yieldably supporting the outer end of the cleaner upon the pan, and means for reciprocating the cleaner independently of the screen and the pan.

4. In a separator, the combination of a screen, a pan disposed below the screen and inclined away from the same, means for vibrating the screen and the pan, a cleaner in contact with the under side of the screen, a yieldable support for the outer end of the cleaner carried by the outer end of the pan, and means for vibrating the cleaner independently of the pan and the screen.

5. In a separator, the combination of a screen, means for vibrating the same, a pan disposed below the screen, a cleaner normally in contact with the under side of the screen, a runner for the inner end of the cleaner consisting of a coil, and an arm extending therefrom to ride upon the pan and having its end up-turned and secured to the cleaner, a yieldable support for the outer end of the cleaner carried by the pan, and means for vibrating the cleaner independently of the screen.

6. The combination with a screen and a pan disposed below the same, of a cleaner in contact with the under side of the screen, guide pins mounted in the pan, a bar carried by said pins, springs coiled around the pins between said bar and the pan whereby the bar will be held yieldably to the outer end of the cleaner, yieldable supports at the inner end of the screen riding on the pan, and means for reciprocating the cleaner independently of the screen.

In testimony whereof I affix my signature in presence of two witnesses.

HARVEY W. SMITH. [L. S.]

Witnesses:
GEO. R. HENDRICKS,
S. L. YODER.

Copies of this patent may be obtained for five cents each, by addressing the "Commissioner of Patents. Washington, D. C."